United States Patent
Ottnad et al.

(10) Patent No.: US 11,747,513 B2
(45) Date of Patent: Sep. 5, 2023

(54) SENSOR APPARATUS

(71) Applicants: SICK AG, Waldkirch/Breisgau (DE); TRUMPF Werkzeugmaschinen GmbH + Co. KG, Ditzingen (DE)

(72) Inventors: Jens Ottnad, Karlsruhe (DE); Dennis Wolf, Rutesheim (DE); Kevin Lutz, Boblingen (DE); Christoph Blömker, Stuttgart (DE); Michael Burger, Simonswald (DE); Peter Steurer, Geislingen (DE); Günter Hirt, Steinach (DE); Stefan Kienzler, Freiburg (DE)

(73) Assignees: SICK AG, Waldkirch/Breisgau (DE); TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 0 days.

(21) Appl. No.: 17/415,940

(22) PCT Filed: Dec. 20, 2018

(86) PCT No.: PCT/EP2018/086311
§ 371 (c)(1),
(2) Date: Jun. 18, 2021

(87) PCT Pub. No.: WO2020/126006
PCT Pub. Date: Jun. 25, 2020

(65) Prior Publication Data
US 2022/0082724 A1 Mar. 17, 2022

(51) Int. Cl.
*G01V 8/20* (2006.01)
*B23Q 15/007* (2006.01)

(52) U.S. Cl.
CPC ............ *G01V 8/20* (2013.01); *B23Q 15/007* (2013.01)

(58) Field of Classification Search
CPC ........ G01V 8/20; B23Q 15/007; B23Q 15/12; B23Q 15/14; B23Q 15/22
See application file for complete search history.

(56) References Cited

U.S. PATENT DOCUMENTS

| 5,752,215 A | 5/1998 | Loubser et al. |
| 7,763,820 B1 | 7/2010 | Sommer, Jr. et al. |
(Continued)

FOREIGN PATENT DOCUMENTS

| DE | 9306724 U1 | 12/1993 |
| DE | 4305559 A1 | 8/1994 |
(Continued)

OTHER PUBLICATIONS

International Search Report and Written Opinion dated Sep. 11, 2019 in corresponding International Patent Application No. PCT/EP2018/086311, filed Dec. 20, 2018 (with partial English Translation).
(Continued)

*Primary Examiner* — Kevin K Pyo
(74) *Attorney, Agent, or Firm* — GLOBAL IP COUNSELORS, LLP (57) ABSTRACT

A sensor apparatus for detecting a target object influenced by a process or formed in the process includes a sensor unit and an evaluation device. The sensor unit detects the target object in a detection zone of the sensor unit and generates a sensor signal that can be influenced by the target object. The evaluation device processes the sensor signal as a first input variable and generates an output signal, which indicates the detection of the target object, in dependence on the sensor signal. The evaluation device further processes a process parameter of the process, which acts on the target object, or a target object parameter, which characterizes the target object and is influenced by the process, as a respective further input variable and to generate the output signal in
(Continued)

dependence on the process parameter and/or the target object parameter.

22 Claims, 6 Drawing Sheets

(56) References Cited

U.S. PATENT DOCUMENTS

2003/0076224 A1* 4/2003 Braune .................. F16P 3/142
340/500
2005/0205763 A1 9/2005 Beck et al.

FOREIGN PATENT DOCUMENTS

| | | |
|---|---|---|
| DE | 10 2004 038906 A1 | 3/2006 |
| DE | 20 2007 014313 U1 | 1/2008 |
| DE | 10 2013 019 532 A1 | 5/2015 |
| EP | 0 559 357 A1 | 9/1993 |
| EP | 2 008 735 B1 | 12/2008 |
| EP | 2 037 297 A1 | 3/2009 |
| EP | 2 413 159 A1 | 2/2012 |
| EP | 2915627 A1 | 9/2015 |
| WO | 94/08258 A1 | 4/1994 |
| WO | WO-2015128174 A1 * | 9/2015 ............... B07C 5/10 |
| WO | 2016/095882 A1 | 6/2016 |

OTHER PUBLICATIONS

German Office Action dated Jan. 26, 2023 in corresponding German Application No. 18830824.1.

* cited by examiner

SENSOR APPARATUS

CROSS-REFERENCE TO RELATED APPLICATIONS

This application is a U.S. National Stage Application of International Application No. PCT/EP2018/086311, filed Dec. 20, 2018, the contents of which are hereby incorporated herein by reference.

BACKGROUND

Field of the Invention

The present invention relates to a sensor apparatus for detecting a target object, which is influenced by a process or formed in the process, and to a machine comprising a sensor apparatus.

Background Information

Conventional sensor apparatuses for detecting target objects are inter alia used in automation technology, production technology, and packaging technology to recognize workpieces or other objects machined or processed in an automation process. A material flow in such systems can in particular be monitored by such a sensor apparatus. The measurement object is usually detected by a sensor unit of the sensor apparatus. Such sensor units can have a single receiver for detecting the target object, but they can in particular also be of a multi-channel design and comprise a plurality of receivers.

SUMMARY

It has been found that the reliability of the object detection often depends on previously set threshold values of the individual receivers of the sensor unit. The threshold values determine at which signal change of a receiver an object or an object part is detected. If the threshold values are set incorrectly, false detections of interference variables (for example of smaller foreign bodies, slag, flue gases, dust, aerosols) occur or alternatively a non-detection of the object occurs.

If a sensor apparatus is used in machine tools or in production plants for monitoring the material flow, a false detection of interference variables can in the worst case lead to machine damage since the object actually to be detected is undesirably still located in a working space of the machine. Alternatively, the non-detection of an already expelled workpiece part can have the result that the production process in the machine is unnecessarily interrupted since it is incorrectly assumed that the workpiece still blocks the working space of the machine.

The threshold values therefore have to be defined such that they are as robust as possible with respect to a false evaluation of interference variables and are simultaneously sensitive enough for the reliable detection of the target object. The threshold values can thereby only be defined as a compromise of all the requirements, which usually reduces the accuracy on the detection of the individual object. Furthermore, it is necessary to determine the threshold values anew for each application.

It is an object of the invention to provide a sensor apparatus and a machine that enable a reliable detection of a target object influenced by a process or formed in a process.

This object is satisfied by a sensor apparatus and a machine in accordance with the description herein.

In one embodiment, a sensor apparatus for detecting a target object influenced by a process or formed in the process comprises a sensor unit and an evaluation device, wherein the sensor unit is configured to detect the target object in a detection zone of the sensor unit and to generate a sensor signal that can be influenced by the target object. The evaluation device is configured to process the sensor signal as a first input variable and to generate an output signal, which indicates the detection of the target object, in dependence on the sensor signal. The evaluation device is further configured to process a process parameter of the process, which acts on the target object, and/or a target object parameter, which characterizes the target object and is influenced by the process, as a respective further input variable and to generate the output signal in dependence on the process parameter and/or the target object parameter.

Embodiments of the invention are based on the recognition that the process and properties of the target object formed in or influenced by the process affect the manner in which the target object is detected in the detection zone of the sensor unit. A position of the target object, kinematics, or a movement sequence of the target object in the detection zone can in particular be determined by one or more process parameters of the process and by the object properties, in particular one or more target object parameters. Consequently, the sensor signal, in particular the time development of the sensor signal, also depends on the process or process parameter and on the target object parameters of the target object formed in the process or influenced by the process, wherein the signal development is, for example, influenced by an orientation, a speed, or a rotational movement of the target object in the detection zone.

Since the evaluation device is configured to generate the output signal not only in dependence on the sensor signal, but also in dependence on the process parameter and/or the target object parameter, the evaluation device can take into account the influence of the process and of the properties of the target object represented by the target object parameter on the detection of the target object and can thus particularly reliably detect the target object. Depending on the value of the process parameter, the target object can generate a plurality of different sensor signals that result from different movement patterns or movement sequences of the target object in the detection zone of the sensor unit. When processing of the sensor signal, the evaluation device can therefore, based on the process parameter, make a preselection g as to which sensor signals could be generated by the target object at the point in time of the detection of the sensor signal and are therefore possible.

The target object can be influenced by the process in that it is handled, processed, formed, or manufactured during the process. The target object can in particular be machined in a separating manner or produced in a separating machining process, for instance, by a milling spindle, a saw, a cutting laser, a water jet, or an oxy-fuel cutter. The target object can also merely be moved, for example, by a conveyor belt.

The output signal generated by the evaluation device can also indicate or otherwise negate the detection of the target object, in particular either indicate or negate. The process parameter and/or the target object parameter can each be processed as a second input variable and, if applicable, as a third input variable by the evaluation device. The target object parameter can in particular be read in independently of the sensor signal such that the target object parameter is not derived or does not have to be derived from the sensor signal.

The evaluation device can not only be configured to process the process parameter and/or the target object parameter and to generate the output signal only in dependence on the process parameter and/or the object parameter. The invention also relates to an evaluation device that is generally configured to read in a detection parameter, which acts on the target object in response to the influencing of the sensor signal and is determined by the process, and to process said detection parameter as a further input variable. The evaluation device can also be configured to read in a plurality of such detection parameters and to process them as a further input variable. The detection parameters can in particular be read in independently of the sensor signal such that the detection parameters are not derived from the sensor signal.

Such detection parameters can, for example, comprise the process parameter and/or the target object parameter. The evaluation device can also generally be configured to generate the output signal in dependence on the detection parameter.

The sensor unit can comprise a receiver for detecting a measurement variable influenced by the target object and can be configured to generate the sensor signal in dependence on the measurement variable. The sensor unit can in particular be configured as a multi-channel sensor unit and can respectively comprise one receiver and/or one transmitter per channel (e.g. the sensor unit can be a light grid). The sensor unit can then be configured to generate one respective individual signal per channel and the sensor signal can comprise the individual signals. The sensor unit can be configured to sequentially query the receivers in a predetermined order. The sensor unit can further be configured to sequentially generate and output the individual signals of the sensor signal.

The sensor unit can be configured to continuously output the time development of the sensor signal or of the individual signals to the evaluation device. The sensor unit can be configured to output the sensor signal in the form of raw data, for example, as a digital or analog signal. The sensor unit can also be configured to perform a preprocessing of a measurement signal influenced by the measurement variable and generated by the receiver and, for example, to compare the measurement signal with a predefined threshold value. In this embodiment, the sensor signal can be generated from the measurement signal on the basis of the preprocessing and can, for example, as a binary signal indicate an exceeding or a falling below of a threshold value.

The measurement variable detected by the sensor unit can in particular be electromagnetic radiation, for example light. The electromagnetic radiation can, for example, be influenced by the target object in the detection zone by being shadowed by the target object. However, the electromagnetic radiation can also be reflected by the target object in the detection zone.

The sensor unit can comprise one or more transmitters for generating the electromagnetic radiation and one or more receivers for detecting the electromagnetic radiation. In this respect, a number of transmitters and a number of receivers can be equal. In addition, exactly one transmitter can be associated with each receiver such that each receiver in each case receives the radiation of a single receiver. The electromagnetic radiation of the transmitters can be transmitted in parallel beams. The sensor unit can in particular be configured as a light barrier, a light grid, a cross light barrier, or a light curtain.

However, the receivers of the sensor unit can, for example, also be configured as induction sensors for detecting an induction current generated by the target object, as magnetic sensors for detecting a magnetic field generated by the target object, or as acoustic sensors for detecting an acoustic signal generated by the target object.

Since the evaluation device is configured to process the sensor signal as a first input variable and the process parameter and/or the target object parameter, or generally the detection parameter, as a further input variable in order to generate the output signal, the sensor signal and the process parameter and/or the target object parameter, or generally the detection parameter, influence the output signal. The output signal can indicate as a binary signal whether the target object has been detected or not. However, it can also indicate whether one of a plurality of target objects and, if so, which target object has been detected.

The evaluation device can be configured, on the processing of the sensor signal and of the process parameter and/or the target object parameter, or generally of the detection parameter, to perform a classification of the input variables, that is of the combination to be processed of sensor signal and process parameter, and/or of sensor signal and target object parameter, or generally of sensor signal and detection parameter, and to associate the input variables read in with one of a plurality of output classes. In this respect, the output signal represents the output class as which the input variables were classified. In this respect, a respective output class can be associated with each previously known possible target object.

The possible target objects can comprise the target object processed in the process. The possible target objects can also comprise interference variables, for instance foreign bodies, slag, flue gases, dust, or aerosols. The possible target objects can also comprise a further target object that can be processed in the process.

The evaluation device can, for example, be configured to process the sensor signal and the process parameter and/or the target object parameter, or generally the detection parameter, in order to generate the output signal by comparing the sensor signal with predefined, possible sensor signals, wherein a determination as to which possible sensor signals are used for the comparison is made on the basis of the process parameter and/or the target object parameter, or generally on the basis of the detection parameter. The possible sensor signals may have been determined by series of experiments and/or by machine learning methods. The evaluation device can in particular be configured to compare a time development of the sensor signal or of the individual signals with possible signal developments and to determine which possible sensor developments are to be used for the comparison on the basis of the process parameter and/or on the basis of the target object parameter, or generally on the basis of the detection parameter.

A model, for example a classification model or an expectation model, can be stored in the evaluation device and the evaluation device can be configured to evaluate the development of the sensor signal by the model. The model can, for example, be stored as a rule-based model or as a decision tree in the evaluation device. The model can comprise a first rule that imposes a condition on the sensor signal, and a second rule that imposes a condition on the process parameter and/or the target object parameter, or generally on the detection parameter.

The process parameter can, for example, act on the target object by specifying properties of a handling of the target object that takes place during the process, for instance a speed of a conveyor belt transporting the target object, or by specifying an external force acting on the target object, such as a gas pressure of a cutting gas in the laser cutting. The process parameter determines the manner in which the target object is detected in the detection zone. The process parameter can in particular influence an orientation, a speed, an acceleration, or a rotation of the target object in the detection zone of the sensor unit. The process parameter can also specify in which position, at which time, and/or with which duration the target object is arranged in the detection zone.

The target object parameter can, for example, be influenced by the process in that it is predefined based on the target object to be influenced or to be formed during the runtime of the process. For example, a plurality of target objects differing in their target object parameters can be influenced or formed during the runtime of the process. If the target object is formed during the process by machining a workpiece, the target object parameter can, for example, be predefined by a control program of the process that controls the processing. The target object parameter can, for example, be influenced by a geometry or contour of the target object to be created on the processing. The target object parameter can, for example, describe the geometry or contour.

In a further development, the sensor apparatus is configured to detect the target object while the target object is in motion. The evaluation device is configured to generate the output signal in dependence on a time development of the sensor signal. In this respect, the process parameter preferably acts on the target object in that the process parameter influences the movement sequence of the target object in the detection zone of the sensor unit.

Since the target object is detected while it is in motion, the target object can be recognized particularly quickly during the runtime of the process. In particular, no braking or fixing of the target object is necessary. The target object can in particular be detected in free fall through the detection zone. The movement sequence of the target object can in particular comprise a speed, a rotation, a position, or an acceleration of the target object.

Alternatively or additionally, the target object parameter or generally the detection parameter can also act on the target object in that the target object parameter or generally the detection parameter influences the movement sequence of the target object in the detection zone. This can, for example, be the case with a target object parameter or detection parameter that represents a mass or an air resistance of the target object.

In a further development of the sensor apparatus, the evaluation device is configured to process a direct process datum of the process as the process parameter. A datum in the sense of this description in this respect represents a single data unit of a plurality of pieces of data. The process datum in particular represents a single data unit of the process data generated on the control of the process. The direct process datum can in particular be an output datum to an actuator acting on the target object as part of the process and can be transmitted to the actuator as part of the control of the process. The direct process datum can, for example, be generated by a higher-ranking control unit controlling the process. Since a direct process datum of the process is processed as a second input variable by the evaluation device, the process parameter acting on the target object can be particularly quickly and easily determined and transmitted to the evaluation device.

Alternatively or additionally, the target object parameter or generally the detection parameter can also be influenced by the direct process datum or determined by the direct process datum.

In a further development of the sensor apparatus, the direct process datum is selected from the group of: a position of the target object, an orientation of the target object, a cutting gas pressure of a separating device machining the target object, a number of revolutions of a tool machining the target object, a speed of a drive moving the target object, a torque of a drive moving the target object, or an expulsion point in time of the target object from the process. The expulsion point in time in this respect designates the point in time at which the target object leaves the process. For example, on a separating machining of a workpiece, the expulsion point in time can designate that point in time at which a workpiece part forming the target object has been cut-free.

In a further development of the sensor apparatus, the sensor apparatus comprises a preprocessing unit, wherein the preprocessing unit is configured to derive the process parameter and/or the target object parameter as an indirect process parameter and/or as an indirect target object parameter from at least one direct process datum of the process and to supply it/them to the evaluation device. In general, the preprocessing unit can be configured to derive the detection parameter as an indirect detection parameter from at least one direct process datum of the process and to supply it to the evaluation device.

The indirect process parameter can be derived from the direct process datum while taking into account a system parameter of the system executing the process and/or taking into account the target object parameter characterizing the target object. The system parameter can, for example, represent a mass of inertia of a movable element of the system. The target object parameter can, for example, represent a mass, an area, or an air resistance of the target object. A model, in particular a physical model, of the target object and/or of the process influencing the target object can be stored in the preprocessing unit and the preprocessing unit can be configured to derive the indirect process parameter from the model, wherein the direct process datum represents an input parameter of the model.

Since the process parameter and/or the target object parameter, or generally the detection parameter, is/are first derived from the direct process datum in the preprocessing unit, the accuracy and/or the speed on the processing of the input variables in the evaluation device can be improved since the relationships between the direct process datum and the indirect process parameter and/or between the direct process datum and the indirect target object parameter, or generally between the direct process datum and the indirect detection parameter, no longer have to be taken into account on the processing of the input variables in the evaluation device.

In a further development of the sensor apparatus, the indirect process parameter is selected from the group of a distance or a position or an orientation of the target object with respect to the sensor unit during the process, a magnitude of a force acting on the target object during the process, or an object region in which a force acts on the target object during the process. The indirect process parameter can in particular map the kinematics of the target object in the detection zone.

The target object parameter characterizing the target object and influenced by the process can be a geometry parameter that characterizes a geometry of the target object.

A target object parameter characterizing the geometry can in particular describe the spatial extent or geometric property of the target object. The target object parameter can be stored together with a plurality of further parameters, for instance in the form of CAD data, a vector graphic, or a point cloud. The target object parameter can be stored in the evaluation device or can be supplied to the evaluation device, for example by the preprocessing unit.

The target object parameter can in particular influence the movement sequence of the target object in free fall, i.e. its orientation, speed, acceleration, or rotation.

The sensor apparatus can be configured to detect a group of further target objects in addition to the target object, wherein the target object and the further target objects define a common object class. In this respect, the same target object parameter can be associated with all the target objects of the object class, in particular with the target object and the further target objects.

In a further development of the sensor apparatus, the target object parameter represents a geometric property of the target object, in particular a length, a width, an area, a contour, a dimension, a very small enveloping rectangle, or a convex envelope of the target object. The target object parameter can in particular be stored as a single parameter. The target object parameter can thereby be processed particularly efficiently.

In a further development of the sensor apparatus, the target object parameter represents a variable influencing the movement of the target object in the detection zone of the sensor unit, in particular a mass, an air resistance, a material, or a density of the target object.

In a further development of the sensor apparatus, model information, obtained from training data, on the dependence of the sensor signal on the process parameter and/or on the target object parameter is stored in the evaluation device, wherein the model information comprises a relationship between the process parameter and possible sensor signals at different values of the process parameter and/or a relationship between the target object parameter and the possible sensor signals at different values of the target object parameter, and wherein the evaluation device is configured to process the input signal on the basis of the model information.

In general, in a further development of the sensor apparatus, model information, obtained from training data, on the dependence of the sensor signal on the detection parameter can be stored in the evaluation device, wherein the model information comprises a relationship between the detection parameter and possible sensor signals at different values of the detection parameter, and wherein the evaluation device is configured to process the input signal and the detection parameter on the basis of the model information.

The model underlying the model information can represent a mathematical or an algorithmic formulation that maps relationships between the first input variable and the further input variable and different possible sensor signals that can be generated by the target object at certain values of the first and further input variables.

The model can, for example, be stored as an expectation model or as a classification model. The model can comprise a plurality of pieces of model information that provide different possible sensor signals. The possible sensor signals can result from the different possible movement sequences of the target object in the detection zone, in particular from possible speeds, for instance rotational speeds and/or center of gravity speeds, and/or from possible spatial orientations of the target object. The evaluation device can in particular be configured to perform a classification of the sensor signal, and thus a distinction between the target object and interference variables, through a comparison between the actually detected sensor signal and the different possible sensor signals.

The model can be designed as a rule-based model or as a decision tree and can comprise the model information as rules. Thus, for convex target objects, it can, for example, be stored as a rule in the model that directly adjacent receivers of the sensor unit always have to detect the target object and no receivers may be "skipped". The model can comprise the model information in the form of a sequence of rules on the basis of which it is determined what features the sensor signal must have so that it represents the target object.

The model can also be stored as a set of rules, for example in tabular form, such that the different possible sensor signals can be read out from the set of rules in the evaluation device for evaluation. For example, the set of rules can comprise a plurality of signal developments that are associated with different objects to be classified. The signal developments may have been determined in test series or simulations with a plurality of target objects.

The model can be obtained from the training data by a supervised learning process. The training data can be obtained in test series by different target objects, in particular by the target object influenced or formed in the process and additional target objects representing interference objects or interference variables. The training data can be measured in real process flows or generated in simulations of the process. The training data in particular comprise sensor signals for all the target objects to be detected. In this respect, the training data of each target object comprise a plurality of sensor signals that have been obtained at different values of the process parameter and/or at different values of the target object parameter, or generally at different values of the detection parameter. It can thereby be ensured that the relationships between possible sensor signals and the process parameter and/or the target object parameter, or generally between possible sensor signals and the detection parameter, are correctly stored in the model.

The model can in particular be obtained from the training data by a neural network. The relationship between the process parameter and/or the target object parameter, or generally the detection parameter, and the possible sensor signals can in particular be generated from the training data by a neural network, wherein the training data have been supplied as input data to the neural network.

The sensor apparatus can be configured to detect a group of further target objects in addition to the target object, wherein the target object and the further target objects define a common object class. The model used by the evaluation device to process the input variables can only be created or trained using training data of a target object of the object class. The evaluation device can thereby be programmed in a particularly simple manner.

In a further development of the sensor apparatus, the model information on the dependence of the sensor signal on the process parameter and/or on the target object parameter is stored in the evaluation device in a rule-based model, in a decision tree, as a regression model, as a neural network, or as a recursive neural network.

In general, the model information on the dependence of the sensor signal on the detection parameter can be implemented in the evaluation device in the rule-based model, in the decision tree, as the regression model, as the neural network, or as the recursive neural network.

If the model information is implemented as a neural network, a neural network exists that has been trained by training data such that it enables the recognition of the target objects on the basis of the input variables. The input variables, in particular the sensor signal and the process parameter and/or the target object parameter, or generally the detection parameter, then represent digital input values of the neural network and the output signal represents one or more output classes of the neural network. The evaluation device can be configured to continuously adapt and improve the neural network during the process runtime, i.e. to train it on the basis of the sensor signals generated during the process runtime. For example, the evaluation device can be configured to receive feedback on false detections and to adapt the neural network on the basis of the feedback in order to improve the efficiency on the detection of the target object.

It is thereby possible to teach the model information in an automated manner, in particular first at a user of the sensor apparatus. The project planning effort of the manufacturer is hereby reduced and the project planning can be carried out by the user himself.

In a further development of the sensor apparatus, further model information on the dependence of the sensor signal on the process parameter and/or on the target object parameter is stored in the evaluation device, wherein the evaluation device is configured to select the model information or the further model information on the basis of the process parameter and/or the target object parameter. In general, further model information on the dependence of the sensor signal on the detection parameter can also be stored and the evaluation device can be configured to select the model information or the further model information on the basis of the detection parameter.

Model information coordinated with the process parameter and/or the target object parameter, or generally with the detection parameter, can thereby be used to detect the target object and the accuracy of the detection can be increased. The model information and the further model information can in particular be stored in different models in the evaluation device such that one of a plurality of models stored in the evaluation device is selected on the basis of the process parameter and/or the target object parameter, or generally on the basis of the detection parameter. The models can in particular have a different structure, for example, a first model can be formed in a rule-based manner and a second model can be implemented as a neural network.

In a further development, the sensor apparatus is configured to read out the sensor signal at a frequency dependent on the process parameter and/or on the detection parameter. In general, the sensor apparatus can be configured to read out the sensor signal at a frequency dependent on the detection parameter. The detection of the sensor signal can thereby, for example, be adapted to a movement of the target object in the detection zone and the accuracy on the detection of the target object can thereby be increased or an adaptation of the sensor apparatus can take place on a part-specific basis.

In a further development, the sensor apparatus is configured to detect a further target object influenced by the process and the evaluation device is configured to generate a further output signal that indicates the detection of the further target object. A distinction can thereby be made between the target object and the further target object and the accuracy of the detection of the target object can be improved. The further target object can in particular be an interference object, for instance, flue gases, slag lumps, dust, aerosols, or foreign particles generated in the process. If the evaluation device is configured to process the sensor signal and the process parameter and/or the target object parameter, or generally the detection parameter, in that the sensor signal and the process parameter or the target object parameter or the detection parameter are associated with predefined output classes, the output signal can represent a first output class and the further output signal can represent a second output class. The output classes can represent possible results of the detection measurement performed by the sensor apparatus. Thus, an output class can represent the detection of the target object. A further output class can represent the detection of the further target object. Yet a further output class can represent a measurement in which no object has been detected, for example neither the target object nor the further target object.

In a further development of the sensor apparatus, the sensor unit comprises a plurality of transmitters for transmitting light or laser beams and a plurality of receivers for receiving the beams, wherein the receivers are configured to generate individual signals of the sensor signal on the basis of the individual received beams. The sensor apparatus can in particular be configured as a light barrier, a light grid, or a light curtain. The sensor apparatus can in particular have an equal number of transmitters and receivers and one receiver can be associated with each transmitter. With such a sensor apparatus, extended target objects can also be recognized and detected in a simple manner.

In a further development of the sensor apparatus, the sensor signal can be influenced by the target object in that the target object interrupts at least one of the beams. The target object can thereby be particularly simply detected by the receiver detecting the respective beam.

In a further development of the sensor apparatus, the sensor unit is configured to read out the individual signals in an order dependent on the process parameter and/or on the target object parameter. In general, the sensor unit can be configured to read out the individual signals in an order dependent on the detection parameter. The manner in which the target object is detected can thereby be adapted to the runtime of the process and the accuracy of the detection of the target object can be increased.

A machine for executing a process is configured to influence or to generate a target object as part of the process and it comprises a sensor apparatus for detecting the target object. The sensor apparatus comprises a sensor unit and an evaluation device, wherein the sensor unit is configured to detect the target object in a detection zone of the sensor unit and to generate a sensor signal that can be influenced by the target object. The evaluation device is configured to process the sensor signal as a first input variable and to generate an output signal, which indicates the detection of the target object, in dependence on the sensor signal. Furthermore, the evaluation device is configured to process a process parameter of the process, which acts on the target object, and/or a target object parameter, which characterizes the target object and is influenced by the process, as a respective further input variable and to generate the output signal in dependence on the process parameter and/or the target object parameter.

The output signal generated by the evaluation device can also indicate or negate the detection of the target object.

The machine in particular comprises the sensor apparatus in accordance with embodiments of the invention. The machine can in particular comprise an actuator that influences the target object as part of the process. The actuator can influence a position of the target object or a movement of the target object in the detection zone of the sensor apparatus. The actuator can in particular influence a speed, an acceleration, a rotational speed, or a point in time of a passage of the target object through the detection zone of the sensor arrangement. The actuator can handle or process the target object as part of the process. The actuator can in particular machine the target object in a separating manner and can be configured as a milling spindle, a saw, a cutting laser, a water jet, or an oxy-fuel cutter. The actuator can also merely move the target object, for example as a drive motor of a conveyor belt. The machine can, for example, be configured as a machine tool or as a packaging machine.

In a further development, the machine is configured as a machine tool. In addition, the machine is configured, on the execution of the process, to machine a workpiece, preferably a plate-like workpiece, in a separating manner while forming a cut-free workpiece part, wherein the target object is formed by the workpiece part. The machine can further be configured, on the execution of the process, to move the workpiece part from a workpiece support into a removal position by free fall and the sensor unit is arranged such that the target object is detected by the sensor unit during the free fall into the removal position. The evaluation device is preferably configured to detect the target object in order to determine whether the target object has reached the removal position.

The machine can in particular be configured as a laser cutting machine. The machine can comprise a working space with the workpiece support and the detection zone of the sensor unit can be arranged beneath the working space. The target object can be expelled from the working space in free fall and can pass through the detection zone on the falling. In addition to the target object, waste products arising on the separating machining can also leave the working space in free fall as interference objects. The evaluation device can be configured to distinguish between the target object and the interference objects on the detection of the target object. The machine can comprise a reception apparatus that is configured to receive the target object expelled in free fall. The machine can be configured to arrange the reception apparatus beneath the working space only on the detection of the target object or to only then enable or open access to the reception apparatus so that the reception apparatus only receives the target object and not also the interference objects. The detection zone of the sensor arrangement can in particular be arranged between the working space and the reception apparatus arranged beneath the working space.

Furthermore, a method of detecting a target object influenced or formed as part of a process as well as further developments of the method are set forth.

BRIEF DESCRIPTION OF DRAWINGS

The invention will be explained in more detail hereinafter with reference to the drawings.

DETAILED DESCRIPTION

Figure 1:
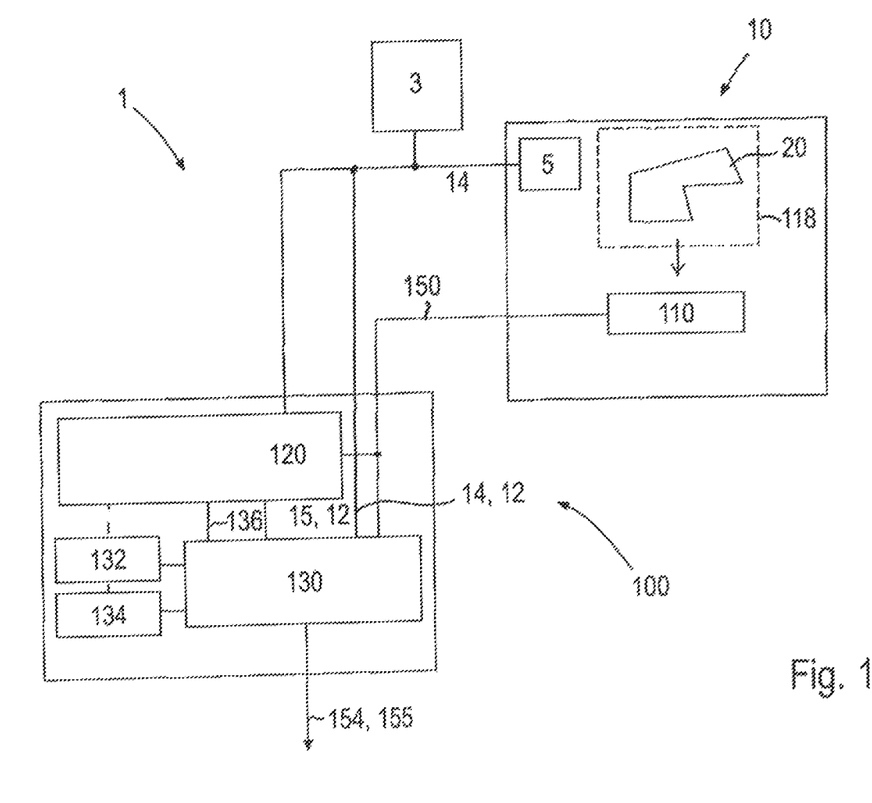
FIG. 1 is a machine for executing a process comprising a sensor arrangement for detecting a target object influenced by the process.

FIG. 1 shows a machine 1 for executing a process 10 comprising a sensor arrangement 100 for detecting a target object 20 influenced by the process 10. The machine 1 comprises an actuator 5 that acts on the target object 20 and that in particular determines a position of the target object 20 or a movement sequence of the target object 20. The actuator 5 is connected to a higher-ranking control unit 3 of the machine 1. The higher-ranking control unit 3 comprises a control program that comprises the information required to control the process 10. The control unit 3 is configured to generate a process datum 14 using the control program, said process datum including information on the control of the actuator 5, for example a position, a switching state, a speed, an acceleration, or a drive current of the actuator 5, or information on the target object 20 influenced by the process 10, for example its position or orientation on an expulsion from the process 10.

The control unit 3 transmits the process datum 14 to the actuator 5 to control the actuator 5, and thus the influence of the actuator 5 on the target object 20. In addition to the process datum 14, the control unit 3 transmits further process data 14 to the actuator 5. The process datum 14 forms a direct process datum. A direct process datum 14 is processed directly by the actuator 5 and determines the control state of the actuator 5. The actuator 5 can, for example, be a motor and the direct process datum 14 can control a speed of the motor. The actuator 5 can also be a valve or a switch and the direct process datum 14 can control the position of the valve or switch.

The machine 1 comprises a sensor apparatus 100 for detecting the target object 20. The sensor apparatus 100 comprises a sensor unit 110 and an evaluation device 130. The sensor unit 110 is configured to detect the target object 20 in a detection zone 118 of the sensor unit 110 and to generate a sensor signal 150 that can be influenced by the target object 20. The sensor unit 110 can in particular be configured as a light barrier, a light grid, or a light curtain. The sensor unit 110 can also be configured as a camera or as a magnetic, inductive, or acoustic sensor. The sensor unit 110 can be designed as multi-channel such that the sensor signal 150 comprises a plurality of individual signals. The evaluation unit 130 and the sensor unit 110 can be arranged in a common housing or separately from one another. The evaluation unit 130 can also be arranged in the higher-ranking control unit 3.

The sensor unit 110 is connected to the evaluation device 130 to transmit the sensor signal 150 to the evaluation device 130. The sensor unit 110 can in particular be configured to transmit the time development of the sensor signal 150 to the evaluation device 130 during the runtime of the process 10. If the sensor signal 150 comprises a plurality of individual signals, the sensor unit 110 can be configured to transmit the time development of the individual signals as the sensor signal 150 to the evaluation device 130. The evaluation device 130 is furthermore configured to receive a process parameter 12 acting on the target object 20. The process parameter 12 can be supplied as the direct process datum 14 to the evaluation device 130. For this purpose, the sensor unit 110 can, as shown, be connected to the higher-ranking control unit 3 and/or to the actuator 5. The current values of the process parameter 12 can be supplied to the evaluation device 130 during the runtime of the process 10.

Alternatively or additionally, the evaluation device 130 can also, as likewise shown, be connected to a preprocessing unit 120 of the sensor apparatus 100 and the process parameter 12 can also be supplied as an indirect process parameter 15 to the evaluation device 130 by the preprocessing unit 120. The preprocessing unit 120 and the evaluation device 130 can be arranged in a common housing or separately from one another. The preprocessing unit 120, the evaluation device 130, and the higher-ranking control unit 3 can in particular be arranged in a common housing. The preprocessing unit 120, the evaluation device 130, and/or the higher-ranking control unit 3 can each be configured as programmable logic modules, for example, as microcontrollers or FPGAs.

The preprocessing unit 120 is connected to the control unit 3 and/or to the actuator 5 and is configured to receive the direct process datum 14, for example from the control unit 3 and/or the actuator 5. The preprocessing unit 120 is configured to derive the process parameter 12 as the indirect process parameter 15 from the direct process parameter 14. For this purpose, derivation information is stored in the preprocessing unit 120 and defines a relationship between the direct process datum 14 and the process parameter 12 to be transmitted to the evaluation device 130 as the indirect process parameter 15. The preprocessing unit 120 can, for example, comprise derivation information by which a distance or a position or an orientation of the target object 20 with respect to the sensor unit 110, a magnitude of a force acting on the target object 20, or an object region in which a force acts on the target object 20 during the process 10 can be derived from the direct process datum 12 as an indirect process parameter 15. The derivation information can in particular comprise a physical model of the target object 20 and/or of the machine 1.

The evaluation device 130 is configured to process the sensor signal 150 as a first input variable and the process parameter 12 as a second input variable and to generate an output signal 154 in dependence on these input variables. The output signal 154 indicates whether the target object 20 has been detected or not. The output signal 154 can, for example, be output as a binary signal.

The evaluation device 130 can also be configured to process a target object parameter 136 as a second or third input variable as an alternative to or in addition to the process parameter 12 and the sensor signal 150 and to generate the output signal 154 in dependence on the target object parameter 136. The target object parameter 136 can, as shown, be predefined for the evaluation device 130 by the preprocessing unit 120, but the target object parameter 136 can also be stored in the evaluation device 130.

The target object parameter 136 can be a geometry parameter that describes the geometry of the target object 20. The target object parameter 136 can also be a parameter that describes a physical property of the target object 20, for instance a mass, an air resistance, a density, a surface property, a surface roughness, a material, a reflectivity, or a color of the target object 20. The target object parameter 136 can also be an upper and/or lower boundary of a geometry parameter or an upper and/or lower boundary of a parameter describing a physical property of the target object 20.

At least one associated process parameter 12 and/or at least one associated target object parameter 136 is/are associated with the sensor signal 150. The preprocessing unit 120 and/or the evaluation device 130 can in particular be configured to associate at least one associated process parameter 12 and/or at least one associated target object parameter 136 with the sensor signal 150. The association can take place on the basis of an identifier of the sensor signal 150 that is, for example, added to the sensor signal 150 by the sensor unit 110. The identifier can, for example, be a time stamp that indicates the time at which the sensor signal 150 was detected. The preprocessing unit 120 can, as shown, be connected to the sensor unit 110 to receive the identifier and/or the sensor signal 150.

Model information 132 is stored in the evaluation device 130. The model information 132 describes a relationship between the process parameter 12 and/or the target object parameter 136 and possible sensor signals 150. The model information 132 in particular comprises information on which possible sensor signals 150 can be expected at different values of the process parameter 12 and/or at different values of the target object parameter 136. The evaluation device 130 is configured to process the sensor signal 150, the process parameter 12, and the target object parameter 136 on the basis of the model information 132.

The model information 132 can be stored in the evaluation device 130 in a rule-based model, in a decision tree, as a regression model, or as a neural network, in particular as a recursive neural network. The sensor signal 150, the process parameter 12, and/or the target object parameter 136 each form input variables of the model or of the neural network.

In addition to the model information 132, further model information 134 can be stored in the evaluation device 130. The further model information 134 can be stored in the evaluation device 130, as is described for the model information 132. In this respect, the model information 132 and the further model information 134 can be stored in different ways. The model information 132 and the further model information 134 can in particular be stored as different models or different neural networks.

The evaluation device 130 and/or the preprocessing unit 120 can be configured to select, based on the target object parameter 136 and/or based on the process parameter 12, whether the input variables are processed by the model information 132 or the further model information 134. Value ranges of the target object parameter 136 and/or of the process parameter 12 that are associated with the model information 132 or the further model information 134 can in particular be stored in the evaluation device 130 and/or the preprocessing unit 120. The model information 132 can be used to process the input variables if the target object parameter 136 and/or the process parameter 12 is/are within first value ranges and the further model information 134 can be used to process the input variables if the target object parameter 136 and/or the process parameter 12 is/are within second value ranges.

Figure 2:
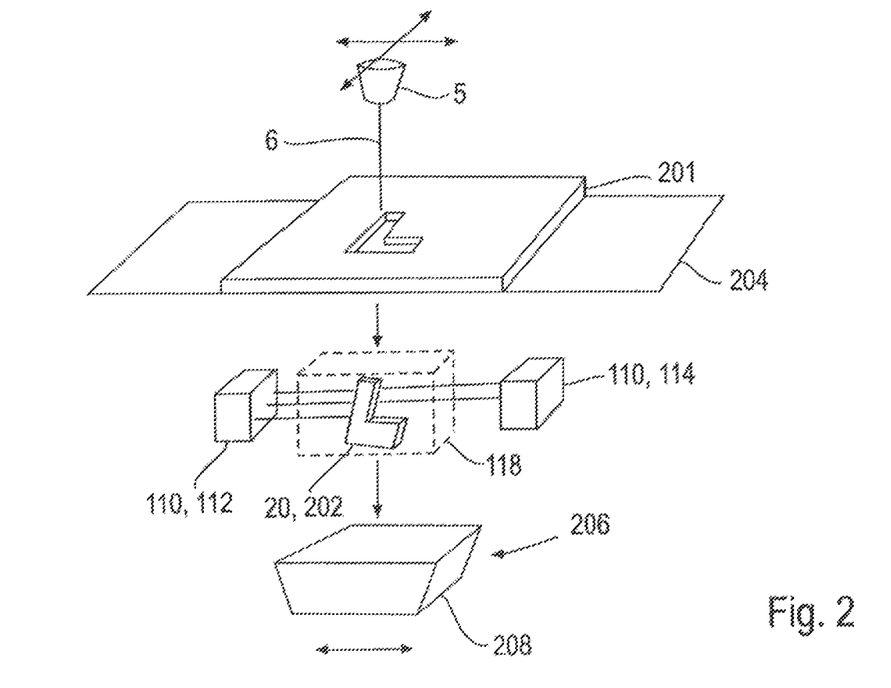
FIG. 2 is an embodiment of the machine configured for a separating machining of a workpiece.

FIG. 2 shows an embodiment of the machine 1 in which the machine 1 machines a workpiece 201, in particular a plate-shaped workpiece 201, in a separating manner on the execution of the process 10. The machine 1 can in particular process the workpiece 201 in a separating manner by laser cutting. The machine 1 comprises a workpiece support 204 which is arranged in a working space of the machine 1 and on which the workpiece 201 is arranged during the machining. The actuator 5 of the machine 1 is configured as a cutting head that processes the workpiece 201 by a cutting beam 6, in particular by a laser beam, and by a cutting gas.

In the machine 1 shown in FIG. 2, the sensor unit 110 of the sensor apparatus 100 is arranged beneath the workpiece support 204. The detection zone 118 of the sensor unit 110 is in particular arranged beneath the workpiece support 204. The sensor unit 110 is configured as a light grid. The sensor unit 110 comprises a plurality of transmitters 112 and a plurality of receivers 114 that are arranged on mutually oppositely disposed sides of the detection zone 118 of the sensor unit 110. The transmitters 112 are configured to emit light beams in the direction of the receivers 114 and the receivers 114 are configured to receive the light beams and to convert them into the sensor signal 150 transmitted to the evaluation device 130, not shown in FIG. 2, of the sensor apparatus 100.

The machine 1 is configured to expel the cut-free workpiece part 202 from the working space in free fall. The detection zone 118 of the sensor unit 110 is arranged such that the cut-free workpiece part 202 passes through the detection zone 118 during the free fall and in so doing forms the target object 20 detected by the sensor apparatus 100. On the expulsion, the workpiece part 202 is accelerated by gravity, on the one hand, and by the forces exerted by the actuator 5 onto the workpiece part 202, on the other hand. At the moment of the cutting free, the workpiece part 202 is in particular accelerated by a pressure of a cutting gas acting on the workpiece part 202.

If the workpiece part 202 has a large extent and/or mass, it is mainly accelerated by gravity, while the pressure of the cutting gas only has a small influence on the acceleration of the workpiece part 202. In this case, the workpiece part 202 in particular falls in a horizontally disposed manner and without a rotation through the detection zone 118 of the sensor unit 110. If, in contrast, the workpiece part 202 has a smaller extent and/or mass, the workpiece part 202 is thus mainly accelerated by the pressure of the cutting gas and is set into rotation in this respect.

In the machine 1 shown in FIG. 2, the pressure of the cutting gas is transmitted as the direct process datum 14 to the evaluation device 130 and/or to the preprocessing unit 120. Furthermore, the mass and/or the extent of the workpiece part 202 is transmitted as the target object parameter 136 to the evaluation device 130 and/or to the preprocessing unit 120. The preprocessing unit 120 can be configured to calculate a rotational speed of the workpiece part 202 from the mass and/or the extent of the workpiece part 202 and/or from the pressure of the cutting gas and to transmit the rotational speed as an indirect process parameter to the evaluation device 130.

The evaluation device 130 processes the sensor signal 150 generated by the sensor unit 110 as a first input variable, and the pressure of the cutting gas and/or the rotational speed determined by the preprocessing unit 120 as a second input variable. Furthermore, the evaluation device 130 can process the mass and/or the extent of the workpiece part 202 as a third input variable.

On the separating machining of the workpiece 201, interference objects, for example slag lumps, which likewise pass through the detection zone 118 of the sensor unit 110, can also be generated in addition to the cut-free workpiece part 202. The evaluation unit 130 can be configured to classify the detected objects as the target object 20 or as interference objects and to generate the output signal 154 when the detected object has been classified as the target object 20, or to generate a further output signal when the detected object has been classified as an interference object.

The detection zone 118 of the sensor unit 110 is arranged between the workpiece support 204 and a removal position 206. The removal position 206 is arranged beneath the detection zone 118 of the sensor unit 110. The cut-free workpiece part 202 forming the target object 20 is detected by the sensor unit 110 during the free fall into the removal position 206. A detection of the target object 20 by the evaluation device 130 of the sensor apparatus 110 indicates that the target object 20 has reached the removal position 206.

In the removal position 206, the target object 20 falls into a reception apparatus 208 arranged in the removal position 206. The reception apparatus 208 can be configured as a transport means or device, for example as a sorting car. The machine 1 is configured to only move the reception apparatus 208 into the removal position 206 when the target object 20 is detected by the sensor apparatus 100. In all other embodiments, in particular on the detection of an interference object, for instance of a slag lump, the removal position 206 can be kept free or a further reception apparatus, such as a slag car, can be arranged in the removal position 206.

Figure 3:
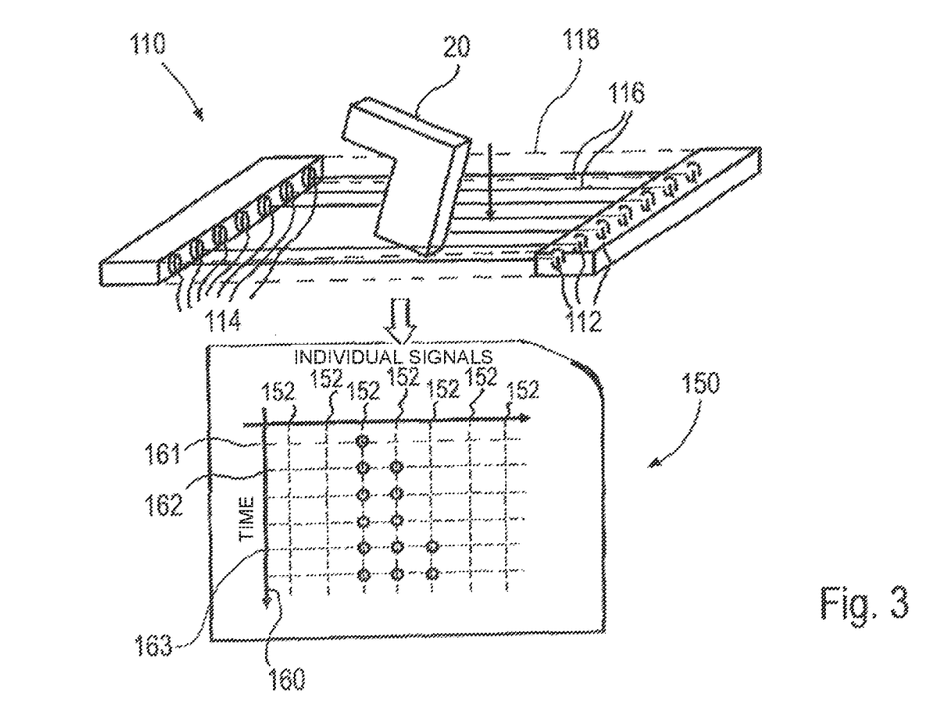
FIG. 3 is a sensor unit of the sensor arrangement with the target object and a sensor signal of the sensor arrangement.

FIG. 3 shows the sensor unit 110 with the target object 20 and the sensor signal 150 generated by the target object 20. The sensor unit 110 comprises a plurality of transmitters 112 and a plurality of receivers 114.

In FIG. 3, the time development of the individual signals 152 is shown and the individual signals 152 are entered against a time 160. The time 160 can, for example, indicate points in time at which the receivers 114 are read out or a measurement signal generated by the receivers 114 is sampled.

On the passage of the target object 20 through the detection zone 118 of the sensor unit 110, only a single beam 116 is interrupted at a first point in time 161 due to the L-shaped geometry of the target object 20. At a later second point in time 162, the target object 20 has moved further such that a wider section of the target object 20 is located in a measurement line defined by the sensor unit 110 than at the first point in time 161. Therefore, due to the translation of the target object 20, two beams 116 arranged in an adjacent manner are interrupted at the second point in time 162. Analogously, three beams 116 arranged in an adjacent manner are interrupted at a still later third point in time 163.

The evaluation device 130 is configured to detect the target object 20 on the basis of the shown time development of the sensor signal 150, in particular on the basis of the time development of the individual signals 152. In this respect, it can in particular be taken into account whether and, if so, how many adjacent beams 116 are interrupted and in what time sequence this takes place.

The model information 132 stored in the evaluation device 130 can inter alia comprise possible sensor signals 150 that can arise on the passage of the target object 20 through the detection zone 118. The model information 132 can inter alia comprise information on how many beams 116 arranged in an adjacent manner are interrupted at a minimum or at a maximum on the passage of the target object 20. In addition, the model information 132 can comprise information on how long individual beams 116 are interrupted at a minimum or at a maximum on the passage of the target object 20. The model information 132 can comprise the information on a plurality of target objects 20. The target object 20 whose associated information is to be used on the processing of the input variables by the evaluation device 130 can be selected on the basis of the target object parameter 136 and/or on the basis of the process parameter 12.

Figure 4:
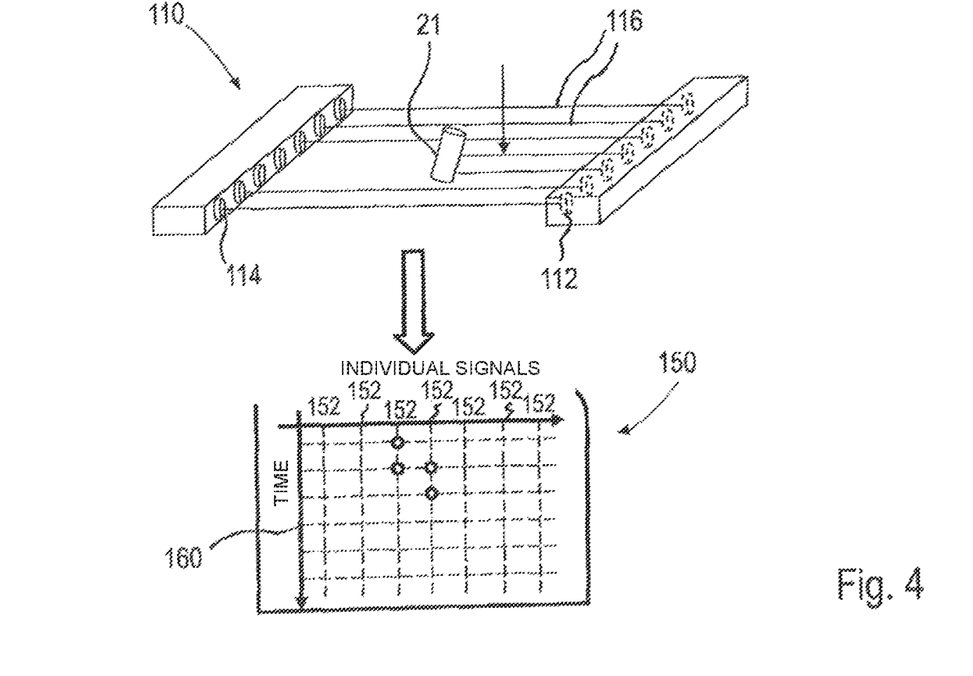
FIG. 4 is the sensor unit with an interference object and an associated sensor signal.

FIG. 4 shows the sensor unit 110 on the passage of a further target object 21 and the associated sensor signal 150. The further target object 21 can in particular be the interference object. The further target object 21 has a smaller extent, in particular a smaller length and width, than the target object 20 shown in FIG. 3. Consequently, on the passage of the further target object 21, the individual signals 152 indicate that the beams 116 are interrupted during a shorter time period and that fewer beams 116 are simultaneously interrupted than is the case with the passage of the target object 20. The evaluation device 130 is configured to detect the further target object 21 on the basis of the time development of the sensor signals 150 shown in FIG. 4, and in particular to distinguish it from the target object 20. Furthermore, the evaluation device 130 is configured to generate the further output signal indicating the detection of the further target object 21.

Figures 5, 6, 7:
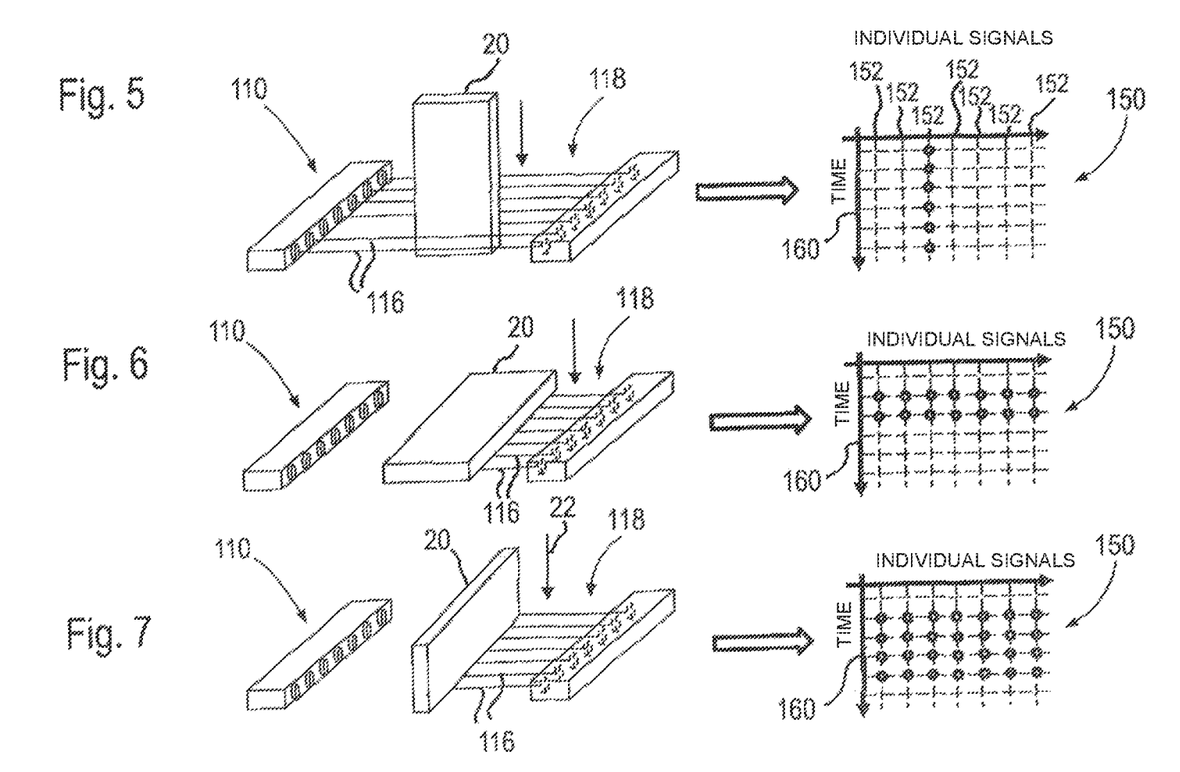
FIG. 5 is the sensor unit with the target object in a first orientation and an associated sensor signal.
FIG. 6 is the sensor unit with the target object in a second orientation and an associated sensor signal.
FIG. 7 is the sensor unit with the target object moving at a first speed in a third orientation and an associated sensor signal.

FIG. 5 shows the sensor unit 110 on the passage of the target object 20 in a first orientation and the associated sensor signal 150. FIG. 6 shows the sensor unit 110 on the passage of the target object 20 in a second orientation and the associated sensor signal 150. FIG. 7 shows the sensor unit 110 on the passage of the target object 20 in a third orientation and the associated sensor signal 150.

The target object 20 is plate-shaped. In the first orientation, the target object 20 passes length-wise through the detection zone 118 of the sensor unit 110. In this respect, an individual beam 116 is interrupted. In the second orientation, the target object 20 passes vertically through the detection zone 118 of the sensor unit 110. A plurality of beams 116, in particular seven beams 116, arranged in an adjacent manner are simultaneously interrupted in this respect. The beams 116 are interrupted during a shorter time period than is the case with the passage of the target object 20 in the first orientation shown in FIG. 5.

In the third orientation, the target object 20 passes width-wise through the detection zone 118 of the sensor unit 110. In this respect, a plurality of beams 116 arranged in an adjacent manner are again interrupted simultaneously. The number of simultaneously interrupted beams 116 corresponds to the number of beams 116 that are interrupted on the passage of the target object in the second orientation shown in FIG. 6. However, the beams 116 are interrupted for a longer time period on the passage in the third orientation shown in FIG. 7 than is the case with the passage of the target object 20 in the second orientation.

The value of the process parameter 12 and/or the value of the target object parameter 136, or generally the value of a detection parameter, can determine whether the target object 20 passes through the detection zone 118 of the sensor unit 110 in the first orientation, in the second orientation, or in the third orientation. Since the evaluation device 130 processes the process parameter 12 and/or the target object parameter 136, or generally the detection parameter, as further input variable(s), the evaluation device 130 obtains information on which of the sensor signals 150 shown in FIG. 5, FIG. 6, and FIG. 7 indicates the detection of the target object 20 with what probability. This information can in particular be stored as model information 132 in the evaluation device 130.

In FIG. 7, the target object 20 moves at a first speed 22 through the detection zone 118 of the sensor unit 110 in the third orientation.

Figure 8:
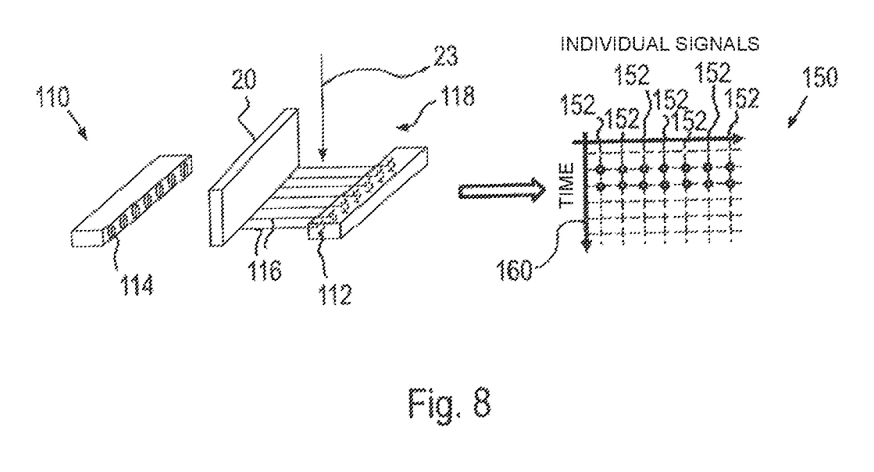
FIG. 8 is the sensor unit with the target object moving at a second speed in the third orientation and an associated sensor signal.

FIG. 8 shows the sensor unit 110 with the target object 20, wherein the target object 20 moves at a second speed 23 through the detection zone 118 of the sensor unit 110 in the third orientation. The second speed 23 is greater than the first speed 22. The associated sensor signal 150 shown in FIG. 8 indicates that the same number of beams 116 arranged in an adjacent manner are interrupted as on the passage of the target object 20 at the first speed 22 shown in FIG. 7. The beams 116 are interrupted during a shorter time period on the passage of the target object 20 at the second speed 23 than is the case with the passage of the target object 20 at the first speed 22.

Based on the process parameter 12 and/or the target object parameter 136, or generally based on the detection parameter, the evaluation device 130 can obtain information on the probability with which the sensor signal 150 shown in FIG. 7 or in FIG. 8 indicates the detection of the target object 20. This information can in particular be stored as model information 132 in the evaluation device 130.

The relationship between the value of the direct process datum 14 and/or of the target object parameter 136, or generally the relationship between the value of the detection parameter and the sensor signals 150 shown in FIGS. 5, 6, 7 and 8, can be stored directly in the model information 132 of the evaluation device 130 and the process datum 14 can be supplied to the evaluation device 130 as the process parameter 12. Alternatively, the orientation and/or the speed of the target object 20 can also be supplied as the process parameter 12 to the evaluation device 130 by the preprocessing unit 120. In this case, preprocessing information is stored in the preprocessing unit 120 and in each case associates an orientation and/or a speed of the target object 20 with the possible values of the direct process datum 14 and the preprocessing unit 120 is configured to select the orientation and/or the speed of the target object 20 to be transmitted to the evaluation device 130 using a physical model and based on the direct process datum 14.

The preprocessing unit 120 and/or the evaluation device 130 can be implemented in the control unit 3 of the machine 1 or can be formed on a spatially remote data processing unit. The spatially remote data processing unit can be server-based or cloud-based. In a server-based design, the preprocessing unit 120 and/or the evaluation device 130 is/are formed on a server that is connected to a plurality of control units of a plurality of machines via a data link. The server can only be accessed within a company, in particular only from a manufacturing site.

In a cloud-based design, a plurality of companies or a plurality of locations are connected to a central cloud-based data processing unit via a data connection, for example via the internet, and the preprocessing unit 120 and/or the evaluation device 130 is/are formed on the central cloud-based data processing unit. A cloud-based data processing unit can be arranged spatially remotely from a plurality of unrelated companies or manufacturing units.

At the spatially remote data processing unit, the process parameter 12 and/or the target object parameter 136 and/or the model information 132 can be stored centrally for a plurality of sensor apparatus 100. This simplifies the exchange of the stored data with other machines and in particular with other manufacturing units and a large amount of data can thus be accessed. The data can be stored in an anonymized manner, i.e. without information on the manufacturing units.

The sensor apparatus 100, for instance the sensor unit 110, can in particular be connected to the spatially remote data processing unit, for example via an intranet or the internet, and can transmit the sensor signal 150 to the spatially remote data processing unit. The evaluation device 130 can be formed on the spatially remote data processing unit and the sensor signal 150 can be processed by the spatially remote data processing unit.

The evaluation device 130 and/or the preprocessing unit 120 can be designed as services on the spatially remote data processing unit and the sensor apparatus 100, in particular the sensor unit 110, can be configured to access the services provided. The model used for the processing can also be designed as a service on the spatially remote data processing unit and can be trained or can have been trained by training data that are generated by a plurality of spatially separate sensor units 110 and transmitted to the spatially remote data processing unit. The services can in particular each be designed as a microservice.

In a design of the evaluation device 130 and/or of the preprocessing unit 120 on a spatially remote data processing unit, the number of connected sensor apparatus 100 can be scaled in a particular simple manner since the number of possible applications are limited or are similar. Thus, a universal sensor apparatus 10, which is configured to detect a plurality of different target objects 20, can be provided in a simple manner, for example, by an exemplary model, and/or by an exemplary process parameter 12, and/or by an exemplary target object parameter 136.

The invention claimed is:

1. A sensor apparatus for detecting a target object influenced by a process or formed in the process, the sensor apparatus comprising:
   a sensor unit; and
   an evaluation device,
   the sensor unit configured to detect the target object in a detection zone of the sensor unit upon the target object entering free fall after formation by a machine and to generate a sensor signal capable of being influenced by the target object,
   the evaluation device configured to process the sensor signal as a first input variable and to generate an output signal, which indicates detection of the target object, in dependence on the sensor signal,
   the evaluation device configured to process at least one process parameter of the process, the process parameter acting on the target object, and a target object parameter, the target object parameter characterizing the target object and being influenced by the process, as a respective further input variable,
   the evaluation device configured to generate the output signal in dependence on at least one of the process parameter or the target object parameter, and
   the sensor unit configured to detect the target object in free fall through the detection zone.

2. The sensor apparatus in accordance with claim 1,
   wherein the sensor apparatus is configured to detect the target object while the target object is in motion,
   the evaluation device is configured to generate the output signal in dependence on a time development of the sensor signal,
   the process parameter acts on the target object in that the process parameter influences the movement sequence of the target object in the detection zone of the sensor unit.

3. The sensor apparatus in accordance with claim 1,
   wherein the evaluation device is configured to process a direct process datum of the process as the process parameter.

4. The sensor apparatus in accordance with claim 3,
   wherein the direct process datum is selected from the group of: a position of the target object, an orientation of the target object, a cutting gas pressure of a separating device machining the target object, a number of revolutions of a tool machining the target object, a speed of a drive moving the target object, a torque of a drive moving the target object, or an expulsion point in time of the target object from the process.

5. The sensor apparatus in accordance with claim 1,
   wherein the sensor apparatus comprises a preprocessing unit,
   the preprocessing unit configured to derive at least one of the process parameter or the target object parameter as at least one of an indirect process parameter or an indirect target object parameter from at least one direct process datum of the process and to supply the at least one of the process parameter or the target object parameter as the at least one of the indirect process parameter to the evaluation device.

6. The sensor apparatus in accordance with claim 5,
   wherein the indirect process parameter is selected from the group of: a distance or a position or an orientation of the target object with respect to the sensor unit during the process, a magnitude of a force acting on the target object during the process, or an object region in which a force acts on the target object during the process.

7. The sensor apparatus in accordance with claim 1,
   wherein the target object parameter represents a geometric property of the target object.

8. The sensor apparatus in accordance with claim 1,
   wherein the target object parameter represents a variable influencing the movement of the target object in the detection zone of the sensor unit.

9. The sensor apparatus in accordance with claim 1,
   wherein model information, obtained from training data, on the dependence of the sensor signal on the process parameter or on the target object parameter is stored in the evaluation device,
   the model information comprises a relationship between the process parameter and possible sensor signals at different values of the process parameter or a relationship between the target object parameter and the possible sensor signals at different values of the target object parameter, and
   the evaluation device is configured to process the sensor signal and the process parameter or the target object parameter on the basis of the model information.

10. The sensor apparatus in accordance with claim 9,
    wherein the model information on the dependence of the sensor signal on the process parameter or on the target object parameter is stored in the evaluation device in a rule-based model, in a decision tree, as a regression model, as a neural network, or as a recursive neural network.

11. The sensor apparatus in accordance with claim 10,
    wherein further model information on the dependence of the sensor signal on the process parameter or on the target object parameter is stored in the evaluation device, and
    the evaluation device is configured to select the model information or the further model information on the basis of the process parameter or the target object parameter.

12. The sensor apparatus in accordance with claim 1,
    wherein the sensor unit is configured to read out the sensor signal at a frequency dependent on the process parameter or on the target object parameter.

13. The sensor apparatus in accordance with claim 1,
    wherein the sensor apparatus is configured to detect a further target object influenced by the process, and the evaluation device is configured to generate a further output signal indicating detection of the further target object.

14. The sensor apparatus in accordance with claim 1,
wherein the sensor unit comprises a plurality of transmitters configured to transmit light or laser beams and a plurality of receivers configured to receive the light or the laser beams, and
the receivers are configured to generate individual signals of the sensor signal on the basis of individual received light or laser beams.

15. The sensor apparatus in accordance with claim 14,
wherein the sensor signal is capable of being influenced by the target object in that the target object interrupts at least one of the light or laser beams.

16. The sensor apparatus in accordance with claim 14,
wherein the sensor unit is configured to read out the individual signals in an order dependent on the process parameter or on the target object parameter.

17. A machine for executing a process,
the machine configured to influence or to generate a target object as part of the process,
the machine comprising:
a sensor apparatus configured to detect the target object,
the sensor apparatus comprising a sensor unit and an evaluation device,
the sensor unit configured to detect the target object in a detection zone of the sensor unit upon the target object entering free fall after formation by a machine and to generate a sensor signal capable of being influenced by the target object,
the evaluation device configured to process the sensor signal as a first input variable and to generate an output signal, which indicates the detection of the target object, in dependence on the sensor signal,
the evaluation device configured to process a process parameter of the process, which acts on the target object or a target object parameter, which characterizes the target object and is influenced by the process, as a respective further input variable and to generate the output signal in dependence on the process parameter or the target object parameter,
the sensor unit configured to detect the target object in free fall through the detection zone.

18. A machine for executing a process, the machine configured to influence or to generate a target object as part of the process,
the machine comprising:
a sensor apparatus configured to detect the target object,
the sensor apparatus comprising a sensor unit and an evaluation device,
the sensor unit configured to detect the target object in a detection zone of the sensor unit and to generate a sensor signal capable of being influenced by the target object,
the evaluation device configured to process the sensor signal as a first input variable and to generate an output signal, which indicates the detection of the target object, in dependence on the sensor signal,
the evaluation device configured to process a process parameter of the process, which acts on the target object or a target object parameter, which characterizes the target object and is influenced by the process, as a respective further input variable and to generate the output signal in dependence on the process parameter or the target object parameter,
the sensor unit configured to detect the target object in free fall through the detection zone,
wherein the machine is a machine tool,
the machine is configured, on the execution of the process, to machine a workpiece in a separating manner while forming a cut-free workpiece part,
the target object is formed by the workpiece part,
the machine is configured, on the execution of the process, to move the workpiece part from a workpiece support into a removal position by free fall,
the sensor unit is arranged such that the target object is detected by the sensor unit during the free fall into the removal position, and
the evaluation device is configured to detect the target object in order to determine whether the target object has reached the removal position.

19. A method of detecting a target object influenced or formed as part of a process,
the method comprising:
detecting the target object upon the target object entering free fall through a detection zone of a sensor unit after formation by a machine,
generating a sensor signal capable of being influenced by the target object,
processing the sensor signal as a first input variable,
generating an output signal in dependence on the sensor signal, the output signal indicating detection of the target object,
processing a process parameter of the process, which acts on the target object or a target object parameter, which characterizes the target object and is influenced by the process, as a respective further input variable, and
generating the output signal in dependence on the process parameter or the target object parameter.

20. The method in accordance with claim 19,
wherein the target object is detected while the target object is in motion,
the output signal is generated in dependence on a time development of the sensor signal that results from a movement sequence of the target object in the detection zone, and
the process parameter or the target object parameter influences the movement sequence of the target object in the detection zone of the sensor unit.

21. The method in accordance with claim 19,
wherein the processing of the sensor signal and the processing of the process parameter or the target object parameter comprises preselecting possible time developments of the sensor signal which the target object is capable of generating during the detection of the target object by the sensor unit.

22. The method in accordance with claim 21,
wherein the generation of the output signal comprises comparing a detected time development of the sensor signal with the possible time developments of the sensor signal.

* * * * *